(12) United States Patent
Batdorff et al.

(10) Patent No.: US 7,717,130 B2
(45) Date of Patent: May 18, 2010

(54) FAST-ACTING FLUID CONTROL VALVE

(75) Inventors: Mark A. Batdorff, Wonder Lake, IL (US); John H. Lumkes, Jr., Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 588 days.

(21) Appl. No.: 11/750,180

(22) Filed: May 17, 2007

(65) Prior Publication Data

US 2007/0289649 A1    Dec. 20, 2007

Related U.S. Application Data

(60) Provisional application No. 60/747,427, filed on May 17, 2006.

(51) Int. Cl.
*F16K 11/07* (2006.01)
(52) U.S. Cl. .................. 137/625.33; 251/282
(58) Field of Classification Search ............ 137/625.28, 137/625.33, 625.34, 625.37; 251/282
See application file for complete search history.

(56) References Cited

U.S. PATENT DOCUMENTS

| | | | | | |
|---|---|---|---|---|---|
| 1,938,943 | A | * | 12/1933 | Terry ...................... | 137/625.38 |
| 3,324,879 | A | * | 6/1967 | Bucknell et al. ......... | 137/454.6 |
| 3,937,247 | A | * | 2/1976 | Van der Wal ............. | 251/282 |
| 4,041,982 | A | * | 8/1977 | Lindner ................... | 137/625.3 |
| 4,569,370 | A | * | 2/1986 | Witt ....................... | 137/625.3 |
| 5,054,522 | A | * | 10/1991 | Kowanz et al. ......... | 137/625.33 |
| 5,133,386 | A | | 7/1992 | Magee | |
| 5,400,824 | A | * | 3/1995 | Gschwendtner et al. ...... | 137/625.28 |
| 5,598,871 | A | | 2/1997 | Sturman | |
| 5,640,987 | A | | 6/1997 | Sturman | |

(Continued)

FOREIGN PATENT DOCUMENTS

EP      1211449      5/2002

(Continued)

OTHER PUBLICATIONS

Michael Nieling, Frank J. Fronczak, and Norman H. Beachley; Design of a Virtually Variable Displacement Pump/Motor; University of Wisconsin-Madison, NCFP 105-10.1.

(Continued)

*Primary Examiner*—John Fox
(74) *Attorney, Agent, or Firm*—Hartman & Hartman, P.C.; Gary M. Hartman; Domenica N. S. Hartman

(57) ABSTRACT

A fluid control valve capable of rapidly opening and closing. The valve includes a housing with an annular-shaped spool cavity that contains an annular-shaped spool capable of axial movement within the spool cavity between first and second spool positions. The spool has axially-spaced circumferential spool sealing features and optionally radial passages therethrough. The housing has axially-spaced circumferential housing sealing features configured and disposed within the spool cavity so that, with the spool in the first spool position, fluid flow is enabled through the spool cavity axially between the spool sealing features and the housing sealing features, which provide axial force balancing of the spool. With the spool in the second spool position, the spool sealing features and the housing sealing features cooperate to substantially prevent fluid flow through the spool cavity.

20 Claims, 8 Drawing Sheets

U.S. PATENT DOCUMENTS

| | | | |
|---|---|---|---|
| 6,068,288 | A | 5/2000 | Karolek et al. |
| 6,105,616 | A | 8/2000 | Sturman et al. |
| 6,231,077 | B1 | 5/2001 | Karolek et al. |
| 6,308,690 | B1 | 10/2001 | Sturman |
| 6,474,353 | B1 | 11/2002 | Sturman et al. |
| 7,077,378 | B2 | 7/2006 | Rampen et al. |

FOREIGN PATENT DOCUMENTS

| | | |
|---|---|---|
| EP | 1596039 | 11/2005 |

OTHER PUBLICATIONS

G.S. Payne, A.E. Kiprakis, M. Ehsan, W. H. S. Rampen, J. P. Chick and A. R. Wallace; Efficiency and dynamic performance of Digital Displacement hydraulic transmission in tidal current energy converters; School of Engineering and Electronics, The University of Edinburgh, Edinburgh, UK; Proc. IMechE vol. 221 Part A; J. Power and Energy.

W. Rampen; Gearless Transmissions for Large Wind Turbines—The history and Future of Hydraulic Drives; Artemis IP Ltd., Scotland.

* cited by examiner

FAST-ACTING FLUID CONTROL VALVE

CROSS REFERENCE TO RELATED APPLICATIONS

This application claims the benefit of U.S. Provisional Application No. 60/747,427, filed May 17, 2006, the contents of which are incorporated herein by reference.

BACKGROUND OF THE INVENTION

The present invention generally relates to fluid control valves. More particularly, this invention relates to a fast-acting fluid control valve capable of opening and closing more quickly that conventional valves of comparable flow capacity as a result of reduced moving mass, decreased stroke distance, and increased actuator properties, which preferably include reduced magnetic diffusion time (less lag before activation/deactivation) and increased force to mass ratio.

Research efforts have been made to design fluid control valves with rapid opening and closing speeds. Examples include U.S. Pat. Nos. 6,105,616 and 6,474,353 to Sturman et al., which disclose a valve with two connected flow paths defined at the outer circumferential surface of a solid spool (plunger). The spool is contained and axially movable within a valve housing. The spool has a central axial hole, conferring a generally tubular shape to the spool, to prevent fluid from being trapped between the ends of the spool and the housing and exerting a counteracting static force on the spool. While the spool is capable of rapidly opening and closing in part due to the very small size of the spool, speed is limited by inherent eddy currents in the spool and the relatively large mass of the spool resulting from its relatively thick wall. The extent to which the thickness of the spool wall can be reduced is limited by hoop stresses, since all fluid pressure is exerted on the exterior of the spool.

Another example of a rapid-actuated valve is disclosed in U.S. Pat. No. 7,077,378 to Rampen et al., which notably differs from the valve taught by Sturman et al. by having an annular-shaped spool (sealing ring) that is axially actuated by a combination of magnets (permanent and/or electromagnetic) and optionally springs. Flow is axial over the inner and outer circumferential surfaces of the spool, thereby avoiding the effect of hoop stresses on the structural integrity of the spool. Because flow is entirely in the axial direction, the shape of the spool must be carefully tailored so that closure of the spool against axially spaced seats occurs while maintaining approximately equal flow velocities at the inner and outer circumferential surfaces of the spool. Nonetheless, the spool is a check valve that cannot open against very high pressures because it is not axially balanced.

Notwithstanding the above, further improvements in valve performance, and particularly speed for a given flow rate capacity, would be desirable.

BRIEF SUMMARY OF THE INVENTION

The present invention provides a fast-acting fluid control valve capable of opening and closing more rapidly than existing valves of comparable size (flow area) because of a reduced moving mass, decreased moving distance, and increased actuator properties.

The fluid control valve includes an annular-shaped spool and a housing having an annular-shaped spool cavity in which the spool is received so as to be capable of axial movement within the spool cavity between first and second spool positions. The spool has multiple radial passages therethrough and multiple axially-spaced circumferential spool sealing features. The housing has multiple axially-spaced circumferential housing sealing features configured and disposed within the spool cavity so that, with the spool in the first spool position, fluid flow is enabled through the spool cavity, the fluid flow being enabled radially through the radial passages of the spool and axially between the circumferential spool sealing features and the circumferential housing sealing features. With the spool in the second spool position, the circumferential spool sealing features and the circumferential housing sealing features cooperate to substantially prevent fluid flow through the spool cavity.

According to a preferred aspect of the invention, the spool is configured to be axially force balanced and preferably also radially force balanced. Specifically, the axially-facing surfaces of the spool (e.g., defining the axially-spaced flow paths) are approximately equal in surface area and, during operation of the control valve, are subjected to approximately equal and opposite pressures so that the resulting axial forces substantially cancel each other out, and radially-facing surfaces of the spool (e.g., defining the spool sealing features and axially-spaced flow paths) are approximately equal in surface area and, during operation of the control valve, are subjected to approximately equal and opposite pressures so that the resulting radial forces substantially cancel each other out. As a result of being axially force balanced, the spool is able to open against very high supply pressures. As a result of being radially force balanced, the spool is able to withstand very high pressures without concern that its annular shape will render the spool prone to bursting from excessive interior pressures or crumpling from excessive exterior pressures.

According to another preferred aspect of the invention, the fluid control valve is capable of opening and closing much faster than conventional valves of equivalent size (flow area) due to employing a spool of minimal mass and minimal stroke. The mass of the spool can be minimized as a result of being annular shaped with minimal wall thickness, made possible because the spool has equal and opposite flow paths (and hence pressure) on its interior and exterior that cancel out radial stresses (hoop stresses). The spool provides multiple flow paths along its length, both circumferentially around its inner and outer surfaces as well as radially through the wall of the spool, and is capable of maximizing flow area per displacement so that the stroke of the spool can be minimized. Additional flow paths can be provided by including paths in the axial direction of the spool.

The minimal mass of the spool reduces the power required to move it, allowing for the use of a variety of actuators to stroke the spool. Preferred actuators are electromagnets having rapid response times and decreased mass, made possible in part as a result of the annular shape of the spool. For example, lag time for activation can be minimized because very thin annular-shaped electromagnets can be used with the annular-shaped spool, and eddy currents are able to more rapidly decay within an annular-shaped electromagnet.

The spool can be configured to have contact sealing surfaces or viscous sealing surfaces, with the former being preferred to minimize manufacturing costs and promote durability and reliability, such as resistance to wear and contamination. Multiple contact sealing surfaces can be achieved by manufacturing the spool in segments and assembling the segments within the spool housing, or configuring a one-piece spool to have minimal overlaps at the contact sealing surfaces and using thermal expansion and/or mechanical elastic stretching of spool and/or housing to assemble the spool.

A variety of applications are possible for the fluid control valve of this invention, including but not limited to camless engines, virtual variable displacement pumps, pulse width modulation (PWM) control of hydraulic systems, axial piston pump displacement control, anti-lock brake systems, active suspension, stability control, and other applications that require a fast switching valve.

Other objects and advantages of this invention will be better appreciated from the following detailed description.

DETAILED DESCRIPTION OF THE INVENTION

FIGS. 1 through 18 illustrate several embodiments of valve assemblies configured in accordance with the present invention. It should be noted that the Figures are drawn for purposes of clarity when viewed in combination with the following description, and therefore are not necessarily to scale.

An original and general goal for valve assemblies of this invention is to exhibit a pressure drop of about 1 bar at flow rates of about 10 liters per minute (lpm), and the ability go from a fully closed to a fully open position, and vice versa, in about 0.5 milliseconds (ms) or less. Further goals were for valve assemblies that are suitable for high volume manufacturing, consume little energy, and are reliable for millions of cycles. While such goals are intended, valve assemblies that do not meet these goals but otherwise incorporate key design feature of this invention are also within the scope of the invention.

Figure 1:
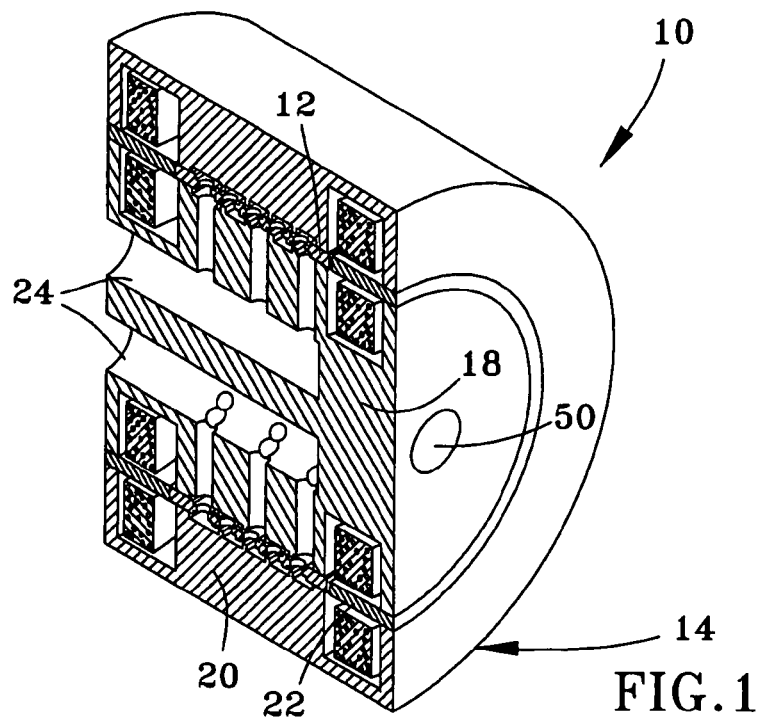
FIGS. 1 and 2 are perspective and cross-sectional views, respectively, of an axial cross-section through a valve assembly configured in accordance with a first embodiment of this invention to have an annular-shaped spool and two pairs of annular-shaped electromagnet actuators for actuating the spool.
Figure 2:
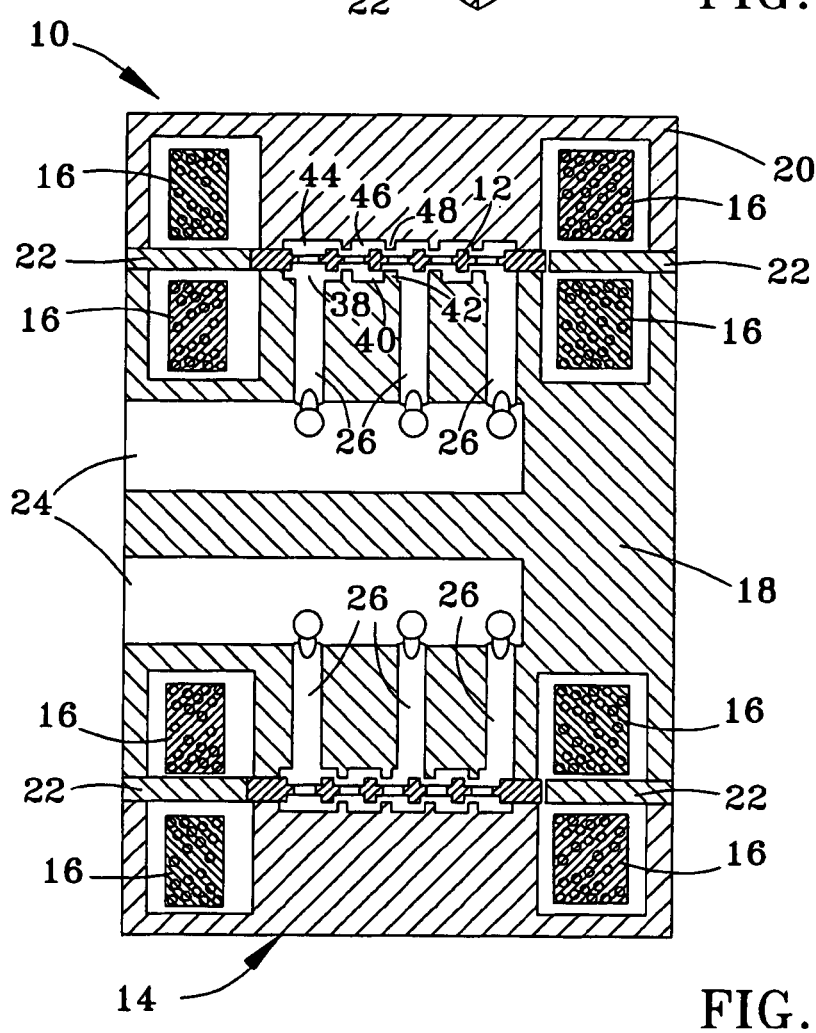

Basic components of valve assemblies of this invention include a valve and its actuator. As represented in FIGS. 1 and 2, a valve assembly 10 is shown as generally encompassing fluid handling components, including a spool 12 and a housing 14 in which the spool 12 is movable (stroked), and an actuator 16 that generally encompasses those components that cooperate to actuate the spool 12 within the housing 14. The housing 14 includes an inner core 18 surrounded by the spool 12, and outer core 20 that surrounds the spool 12, and middle cores 22 that axially space the inner and outer cores 18 and 20 apart to create an annular-shaped cavity in which the spool 12 is enclosed and capable of axial movement relative to the housing 14. The inner core 18 defines one or more axial inlet fluid passages 24 and multiple radial fluid passages 26 that convey fluid to the spool 12. The spool 12 has a ring or annular shape that, as discussed in more detail below, provides certain advantages over conventional solid cylindrical spools, including low mass to promote actuation speed at low power levels and a low moving mass to flow area ratio. Another feature of the spool 12 is a minimal stroke length to minimize power consumption and maximize operating (on-off-on) speeds. Other advantages include the ability to use relatively low tolerance machining techniques without degrading valve performance.

Figure 3:
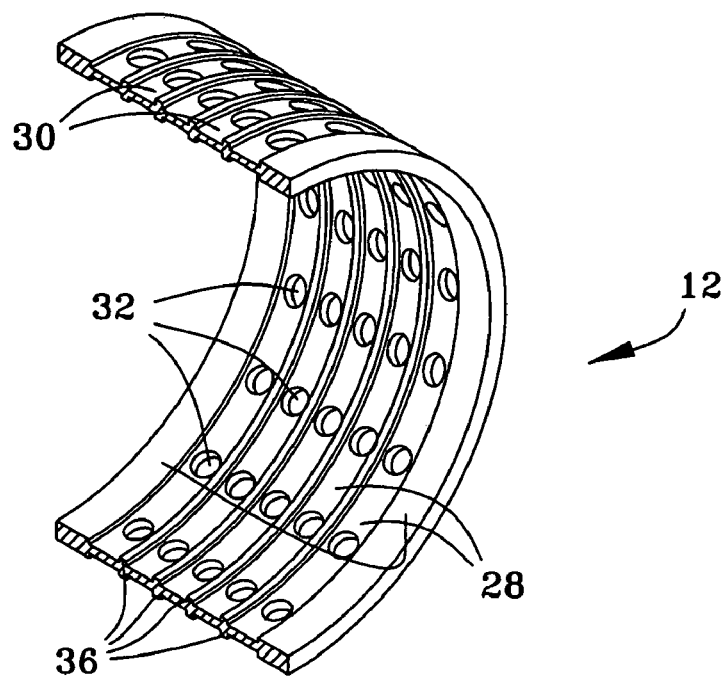
FIG. 3 is an isolated perspective view of an axial cross-section through the spool shown in FIGS. 1 and 2.

As apparent from FIG. 3 taken in combination with FIGS. 1 and 2, the spool 12 defines multiple inner circumferential channels 28 and 30 at its radially inner surface, multiple outer circumferential channels 30 at its radially outer surface, and multiple radial passages 32 through its wall. As discussed in more detail below, raised portions between adjacent inner circumferential channels 28 and between adjacent outer circumferential channels 30 define sealing lands 36 that can be used for viscous or contact sealing with complementary lands 42 defined by and between circumferential flow channels 38 and 40 formed in the outer perimeter of the inner core 18 and complementary lands 48 defined by and between circumferential flow channels 44 and 46 formed in the inner perimeter of the outer core 20. Each circumferential flow channel 38 of the inner core 18 is paired with a circumferential flow channel 44 of the outer core 20, and each circumferential flow channel 40 of the inner core 18 is paired with a circumferential flow channel 46 of the outer core 20. As more readily apparent from FIGS. 4, 5, and 6, fluid flow through the radial flow passages 26 within the inner core 18 is conveyed to the spool 12 through the alternating flow channels 38, hereinafter termed inlet flow channels 38. Those flow channels 40 between the inlet flow channels 38 are coupled to radial outlet passages (not shown) within the inner core 18 that convey the fluid from the spool 12 to one or more axial outlet fluid passages 50 within the inner core 18. As such, the flow channels 40 will be referred to as outlet flow channels 40. While the valve assembly 10 is depicted as being a two-way valve (a single fluid source supplies the spool 12), the valve assembly 10 could be configured as a three-way valve, four-way valve, etc., in which separate inlet and outlet ports are connected to different fluid supplies and returns, respectively. For example, the valve assembly 10 could be configured so that the spool 12 couples a first pair of inlet flow channels 38 to a first outlet flow channel 40 and couples a second pair of inlet flow channels 38 to second outlet flow channel 40, while fluidically isolating the first and second pairs of inlet flow channels 38 from each other and fluidically isolating the first and second outlet flow channels 40 from each other. Such alternatives are within the scope of this invention.

The actuators 16 of the valve assembly 10 are shown as being configured as annular-shaped pairs, one of each pair being housed in the inner core 18 and the other of each pair being housed in the outer core 20, though from the following it should be apparent that the valve assembly 10 could make use of two actuators 16, one at each end of the spool 12. As will also be discussed in more detail below, preferred actuators 16 for use with the invention are capable of providing such advantages as a very short lag time from when a signal is given to energize the actuator 16 and force is created, force to enable high acceleration of the spool, and ease of manufacture. Other desirable attributes for the actuators 16 include reliability, rapid activation (force is generated very rapidly after energizing), rapid deactivation (force is removed very rapidly after de-energizing), small overall size, and efficiency. Several types of electromechanical actuators could be used with the invention, including electromagnets, linear motors, electrostatic devices, moving coils, and piezoelectric stacks, though electromagnetic actuators 16 are believed to be preferred for several reasons, including their ability to generate an appreciable amount of force and induce stroke lengths of several millimeters at relatively small sizes. Electromagnets are also highly scalable, in that as size is reduced the force to mass ratio of an electromagnet increases. Consequently, smaller electromagnets are capable of higher accelerations than larger electromagnets, though at the expense of stroke length, such that spool acceleration can be inversely proportional to size. Electromagnets are also highly reliable (no parts prone to wear), simple to operate (control is simply through controlling electric current), and can be formed of inexpensive materials (typically soft magnetic materials such as steel with wound copper wires).

As known in the art, the electromagnet actuators 16 are activated by applying a voltage to a coil to generate a current in the coil. The current creates a flux that travels in a complete loop and easily passes through steel, but with difficulty through air. The force generated with an electromagnet increases as current increases. Electromagnets act to minimize flux resistance, which means in the presence of an air gap between an electromagnet and a plunger with which the electromagnet is coupled (e.g., the spool 12), the electromagnet will attempt to pull the plunger to close the air gap. At saturation, the force increase per unit current increase begins to taper off. Additional current causes additional resistive losses in the electromagnet coil, causing additional heating of the coil. Adding more windings to an electromagnet will decrease the amount of resistive losses, but requires more space and more material.

Figure 4:
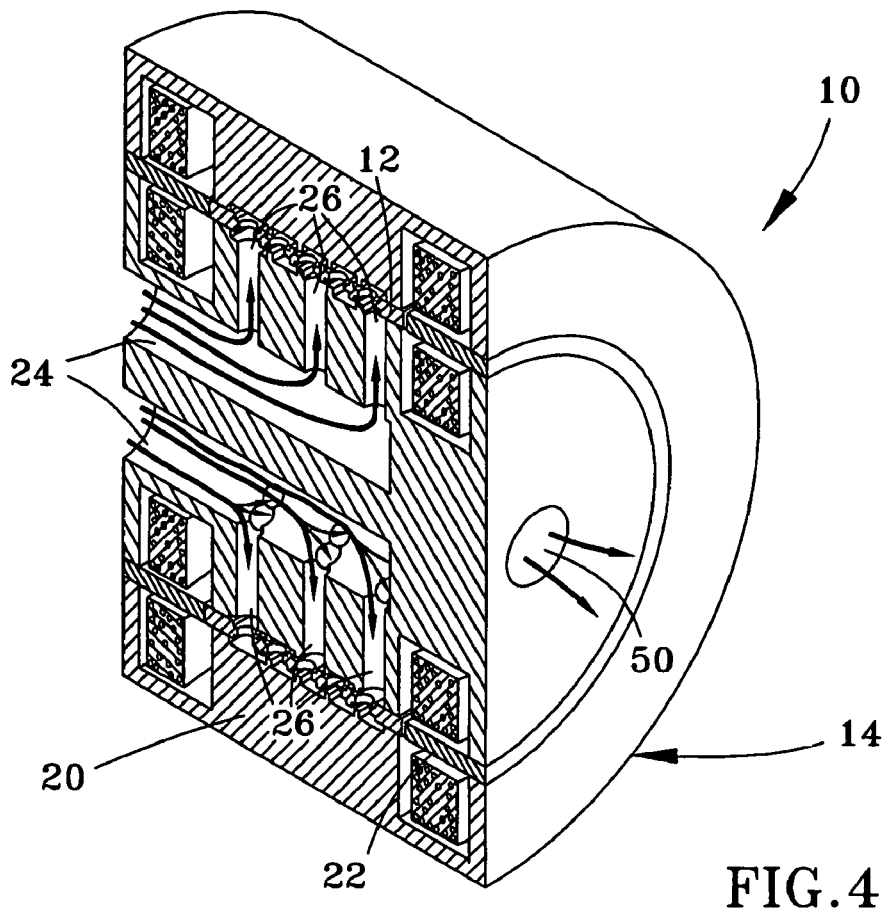
FIG. 4 is a perspective view similar to FIG. 1, but indicating the locations of multiple flow paths through the valve assembly.

The preference for an annular-shaped electromagnet actuator 16 over more conventional disk-shaped electromagnets is due in part to the annular shape preferred for the spool 12 of this invention, in that a first annular-shaped actuator 16 can be located radially inward of the spool 12 and a second annular-shaped actuator 16 can be located radially outward of the spool 12, as evident from FIGS. 1, 2, and 4. The annular shape of the spool 12 renders it more susceptible to force drop-off due to fringing, which refers to the situation in which magnetic flux does not travel linearly across an air gap. Fringing reduces the magnetic flux density in the air gap and hence reduces force. If the air gap aspect ratio (air gap/width of electromagnet) is very low, fringing is not a large factor when determining force. In other words, the force applied to the spool 12 can be maintained nearly the same if the open-closed stroke of the spool is sufficiently short. Though disk-shaped electromagnets are capable of applying a more constant force over larger strokes, the annular-shaped spool 12 preferably has a sufficiently short stroke length (aspect ratios of below 0.2) to render this difference insignificant.

Another consideration in electromagnet and spool design is eddy currents. Whenever a changing magnetic field is present (for example, an electromagnet being turned on or off), a voltage is induced in the electromagnet and the plunger (e.g., spool 12) with which it is magnetically coupled, generating eddy currents that swirl around in a direction opposite the original current source and then decay inwardly toward the center of the electromagnet. Eddy currents must decay for there to be a net current that drives the magnetic flux, which in turn creates the force applied to the spool 12 by the electromagnet actuators 16. As such, immediately after a current step input to the driving coil of the electromagnet actuators 16, no electromagnetic force is applied to the spool 12. As eddy currents decay, force gradually increases until eddy currents have completely decayed and a full (steady state) electromagnetic force is generated. Magnetic diffusion time (MDT) is a reference for assessing the time it takes for eddy currents to decay, and denotes the elapsed time for 63% of the steady state flux density to be at the center of a disk or plate after a step current, corresponding to a build up to almost full (steady state) force. Therefore, decreasing MDT corresponds to more rapid field/force buildup. In this respect, the use of the annular-shaped electromagnet actuators 16 is advantageous over disk-shaped electromagnets, because eddy currents simultaneously decay from both the inner and outer perimeters of the actuators 16.

Though at steady state it may take only a small amount of current to saturate an electromagnet core and jump an air gap, it is possible to more rapidly eliminate eddy currents by applying more current to enable a more rapid buildup of the electromagnetic field. However, an excessively high current applied too long can burn an electromagnetic coil. For this reason, peak and hold circuitry could be used to initially and briefly apply a high current to eliminate eddy currents in the electromagnet actuators 16, immediately followed by a lower current to maintain the electromagnetic field.

An analytical comparison of annular and disk-shaped electromagnets capable of generating an electromagnetic force of 40 N (assuming a magnetic pressure of 1 MPa) on a steel spool estimated that an annular-shaped electromagnet can have a mass about 28% of an equivalent disk-shaped electromagnet and an MDT of about 4.5% of the equivalent disk-shaped electromagnet. As such, the annular-shaped electromagnet actuators 16 are estimated to have a mass of about one-fourth that of a more conventional disk-shaped electromagnet, while simultaneously capable of arriving at a steady-state force more than twenty times more rapidly. The analytic model estimated an MDT for the annular-shaped electromagnet to be about 0.76 ms, which is longer than the above-noted goal of less than 0.5 ms intended for the valve assembly 10. Reductions in MDT are believed to be achievable by, for example, using a silicon steel (having electrical resistivity of about four times greater than regular steel), and/or using a peak and hold circuit. Peak and hold circuitries are well known in the art (for example, for use with fuel injectors) and are commercially available as controllers comprising inexpensive transistors.

The radial wall thickness of the electromagnet actuators 16 can be made increased or decreased with certain advantages and disadvantages associated with each. As the radial wall thickness of an electromagnet is reduced, the force generated by the electromagnet decreases linearly, the MDT decreases quadratically, energy consumption is reduced linearly (because the force is less), the actuator moving mass is reduced linearly, and the electromagnet becomes more susceptible to fringing force drop off. Another way of looking at this issue is, if the velocity of the spool 12 is limited by the weakness of the actuator 16, then the electromagnet actuator 16 should be thicker. However, if spool velocity is limited by lag due to MDT, then the actuator 12 should be thinner.

Figure 10:
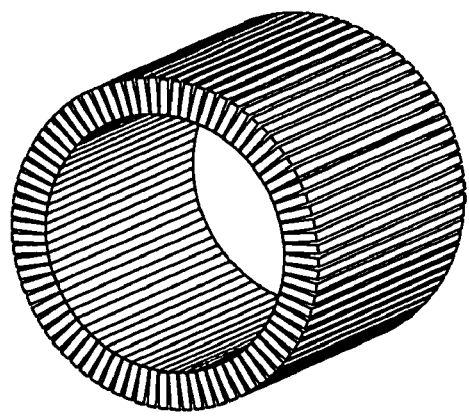
FIGS. 10 and 11 represent alternative embodiments of annular-shaped electromagnetic actuators for use with the valve assemblies of this invention.
Figure 11:
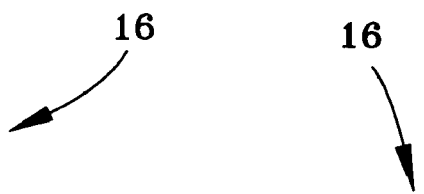

Other alternatives to the design of the actuators 16 include their physical construction. In FIGS. 10 and 11, actuators 16 are represented as being constructed of electrically isolated pieces to reduce MDT, while still capable of a high force to mass ratio attributable to their annular shape. The actuator 16 in FIG. 10 is assembled from rectangular plates, whereas the actuator 16 in FIG. 11 is made up of square rods. For small valve sizes preferred by the present invention, the actuator configurations shown in FIGS. 10 and 11 are believed to be unnecessary, though could be beneficial if a much larger valve assembly is needed. Yet another alternative for the actuators 16 is an E core laminated stack, a well known and practical technique for manufacturing electromagnets. Such an approach might be beneficial if a relatively large valve assembly is required and MDT becomes excessively large. Though more complex and massive than an annular-shaped electromagnet, MDT can be reduced to nearly zero with this type of electromagnet.

As evident from the foregoing, preferred attributes of the valve assembly 10 include a low moving mass, high flow per stroke, compactness, reliability, and low cost. The spool 12 shown in FIG. 4 provides multiple flow paths to create a relatively large total flow area for a given displacement of the spool 12, and with less pressure drop than a spool with a single flow path and the same displacement. As previously discussed, the valve assembly 10 depicted in FIGS. 1, 2, and 4 represents a first embodiment believed capable of achieving the objects of this invention. All components of the assembly 10 can be made from steel, with the exception being copper coils that form the electromagnet actuators 16. Other possible materials are also within the scope of this invention.

Figure 5:
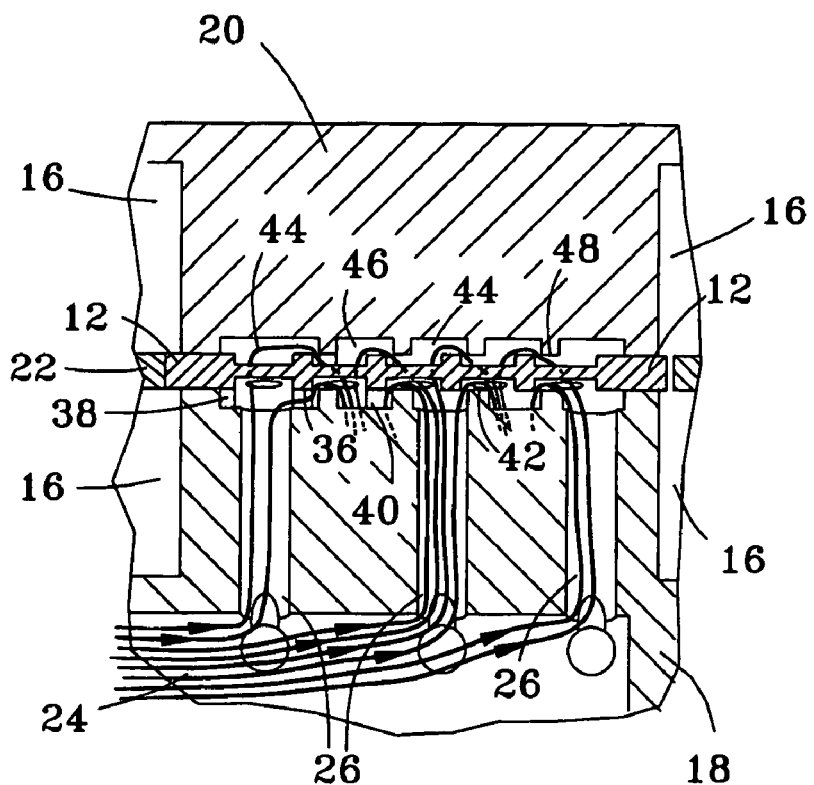
FIGS. 5 and 6 are detailed views indicating the multiple flow paths within a portion of the valve assembly of FIGS. 1, 2 and 4, in which the spool is shown in an open position in FIG. 5 and a closed position in FIG. 6.
Figure 6:
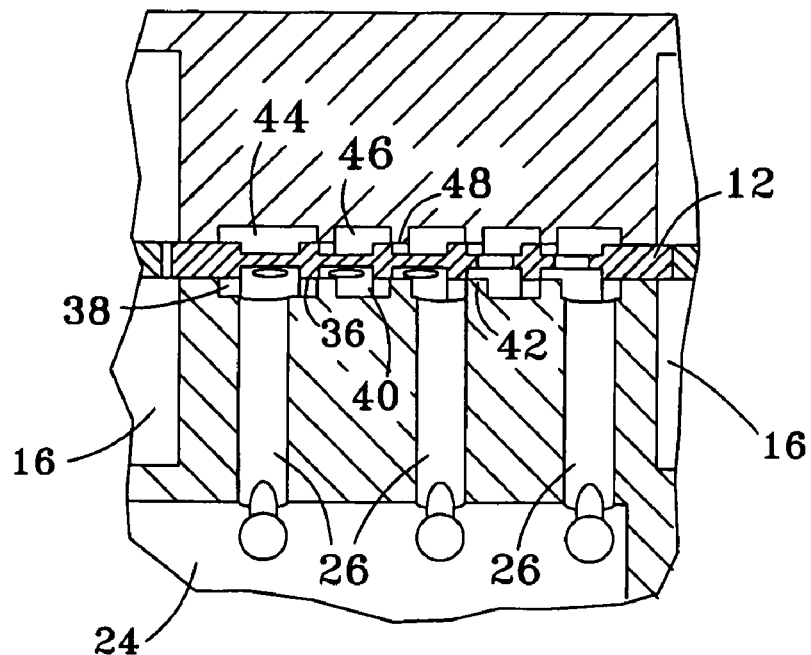

When energized by a current, the electromagnet actuators 16 pull the spool 12, necessitating that at least one electromagnet actuator 16 is located at each end of the spool 12 to achieve a bidirectional movement. In the preferred embodiment shown in FIGS. 1, 2 and 4, a pair of concentric electromagnet actuators 16 is located at each end of the spool 12. Alternatively, a single electromagnet actuator 16 could be used at each end of the spool 12, in which case the outer core 20 should be formed of a nonmagnetic material, such as a nonmagnetic stainless steel. Another alternative is to replace one or more of the electromagnet actuators 16 with another device, such as a different electromechanical device or a purely mechanical device, such as a spring. In the configuration shown in FIGS. 1, 2, and 4, the lefthand electromagnet actuators 16 pull the spool 12 to the left to an open position of the spool 12, and the righthand actuators 16 pull the spool to the right to a closed position for the spool 12. The stroking of the spool 12 by the actuators 16 between the extreme limits of its operation result in the valve assembly 10 being either open (FIG. 5) or closed (FIG. 6), and can therefore be described as being a digital valve, and not a proportional valve. When open, the valve assembly 10 represented in FIGS. 1, 2, and 4 has a continuous fluid course therethrough comprising eight individual flow paths, as indicated in FIG. 5. Specifically, and as previously discussed in reference to FIGS. 4, 5, and 6, fluid flow enters the spool 12 through the inlet flow channels 38 of the inner core 18, and exits through the outlet flow channels 50 of the inner core 18. Because each circumferential flow channel 38 and 40 of the inner core 18 is paired, respectively, with a circumferential flow channel 44 or 46 of the outer core 20 (each pair being fluidically coupled by multiple radial passages 32 of the spool 12), the inner and outer cores 18 and 20 cooperate to define circumferential passages through which the spool 12 is stroked. While the spool 12 is in its open position, the lands 36 of the spool 12 are spaced apart from the lands 42 and 48 of the inner and outer cores 18 and 20, respectively, creating axial flow passages from the circumferential passages defined by the channels 38 and 44 (of the inner and outer cores 18 and 20, respectively) to the circumferential passages defined by the channels 40 and 46 (of the inner and outer cores 18 and 20, respectively), the latter of which are coupled to the axial outlet fluid passage(s) 50 within the inner core 18. In FIG. 6, the valve assembly 10 is closed as a result of the spool 12 being stroked to the right by the actuators 16, resulting in closure of the axial passages between adjacent flow passages defined by the paired channels 38/44 and 40/46.

Figure 7:
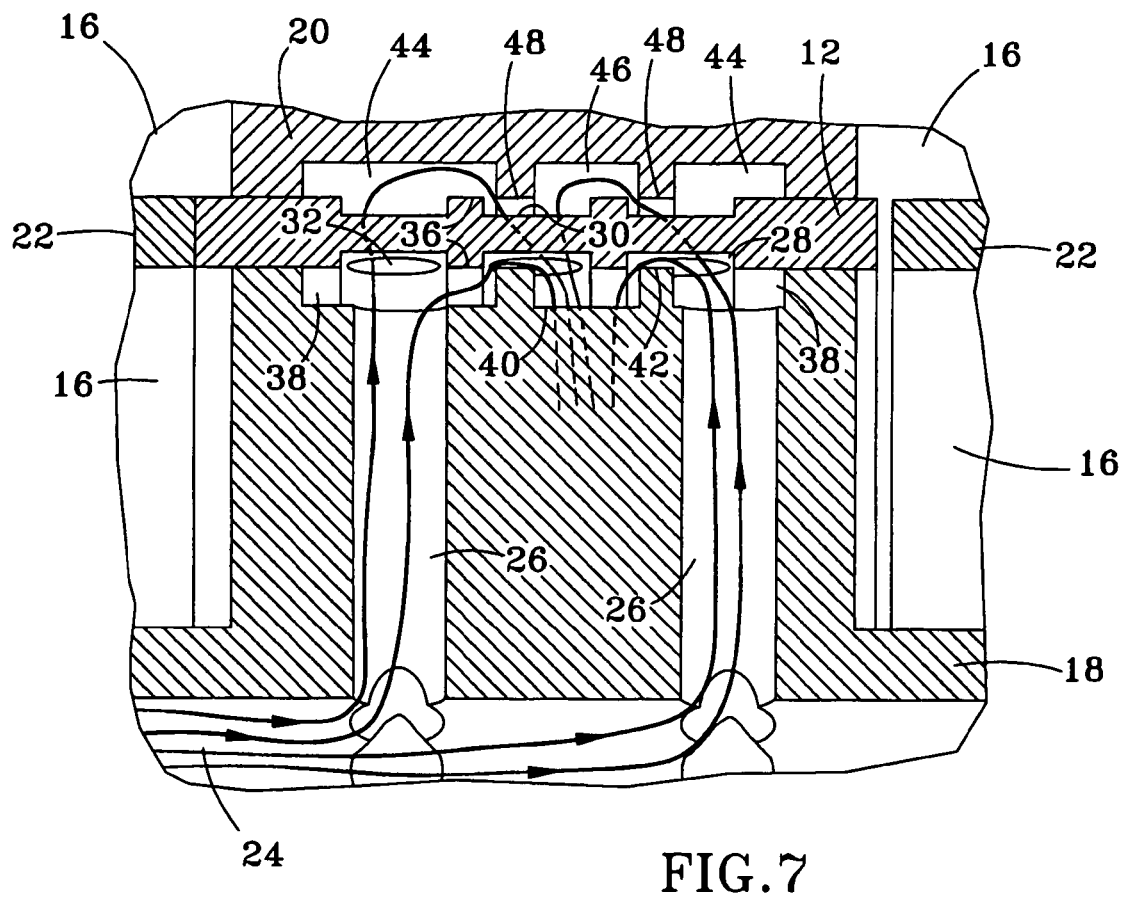
FIG. 7 is a detailed view similar to FIG. 5, but representing a valve assembly in which there are four flow paths instead of the eight flow paths provided by the embodiment of FIGS. 1 through 6.

The valve assembly 10 represented in FIGS. 1, 2, and 4 through 6 is said to have eight flow paths, because fluid is able to flow from each of the six flow channels 38 and 44 into one or both of the two outlet flow channels 40, as indicated in FIG. 5. The valve assembly 10 is not required to have the eight flow paths identified in FIG. 5. For example, the valve assembly 10 could be configured to have fewer (e.g., four as shown in FIG. 7) or more (e.g., twelve, sixteen, etc.). The suitable number of flow paths can be experimentally or analytically determined based on a number of tradeoffs, such as flow area, mass of the spool 12, machining cost, sealing difficulty, and size.

An important aspect of the invention is that the annular-shaped spool 12 with a thin wall as shown in the Figures is capable of operating only if there is approximately equal pressure on the interior and exterior circumferential surfaces of the spool 12. Excessive pressure on the interior surface will cause the thin-walled spool 12 to burst, while excessive pressure on the exterior surface will cause the thin-walled spool 12 to crumple. For this reason, a conventional spool subjected to pressure at only its exterior surface cannot be machined to reduce its mass for the purpose of enhancing performance. However, the configuration of the spool 12 and the opposing channels 38/44 and 40.46 in which it operates provides for approximately equal pressures on the interior and exterior surfaces of the spool 12, with the result that the spool 12 is only slightly stressed and does not deflect. Because flow channels 38, 40, 44, and 46 are present on opposite sides of the spool wall to cancel out hoop stresses, the spool 12 is also required to have equal and opposite sealing surfaces (in the form of the sealing lands 36, 42 and 48) on its interior and exterior surfaces. By nearly eliminating hoop stresses, the spool 12 can be manufactured to have very thin walls and therefore much lighter in weight than if the spool 12 was required to have sufficiently thick walls to withstand hoop stresses. Because of the number of flow passages both circumferentially around and radially through the spool 12, a much greater flow area can be achieved for a given spool displacement, with the result that the spool 12 is not required to have along stroke.

Figure 8:
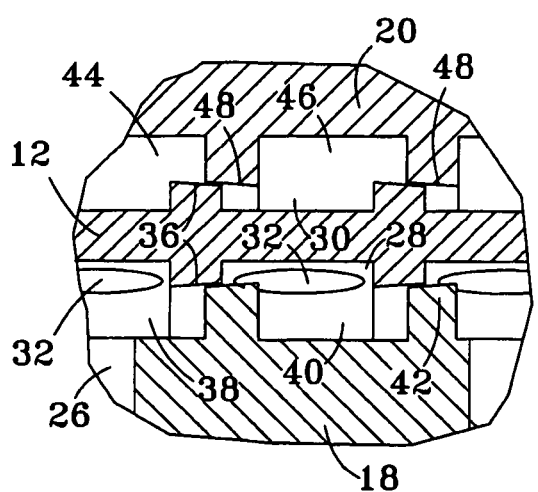
FIGS. 8 and 9 represent two approaches to providing a sealing effect with the valve assemblies of FIGS. 1 through 7.
Figure 9:
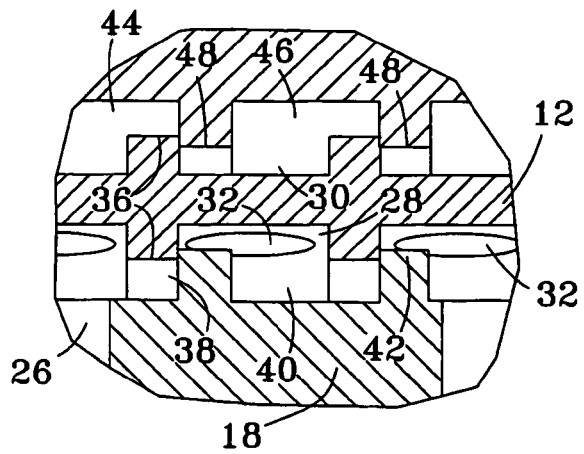

The sealing lands 36, 42, and 48 are depicted in FIGS. 5 and 6 as providing contact sealing, which as more readily apparent from FIG. 9 requires the outer diameter of the sealing lands 36 of the spool 12 to be greater than the inner diameters of the sealing lands 42 and 48 on the inner and outer cores 18 and 20. As an alternative, FIG. 8 represents the sealing lands 36, 42, and 48 as being sized to achieve viscous sealing. As known in the art, viscous sealing relies the presence of a small radial gap between the outer diameter of the spool lands 36 and the inner diameters of the core lands 42 and 48, such that the lands 36, 42, and 48 never contact each other. To stop flow through the valve assembly 10, the spool lands 36 must overlap the core lands 42 and 48 as shown in FIG. 8, creating only a small flow path between the lands 36, 42, and 48 that effectively stops flow through the valve assembly 10 due to high viscous shear forces. In contrast, contact sealing requires that the spool lands 36 actually contact the core lands 42 and 48 to stop flow through the valve assembly 10, as evident from FIGS. 6 and 9.

Viscous and contact sealing have advantages and disadvantages. discussed in the following sections. A notable advantage of viscous sealing is that the spool 12 can be inserted directly into the annular bore between the cores 18 and 20, which greatly facilitates assembly. The cores 18 and 20 can be machined to the same diameters everywhere, making machining easier. However, a disadvantage of viscous sealing is that laminar leakage is always present through the small radial gap. While this leakage can be minimized through high tolerance machining, drilling, reaming, grinding, lapping, and polishing, the required tolerances are relatively expensive to achieve. A viscous sealing spool 12 must also travel farther than a contact sealing spool 12 to achieve the required degree of overlap. On the other hand, an advantage of contact sealing is that leakage flow can be reduced to almost zero. Another advantage is that damping of the spool 12 is reduced because there is no thin fluid layer that must be sheared to allow relative movement between the spool 12 and cores 18 and 20. Also, the lands 36, 42, and 48 are not required to be machined to the tight tolerances required for viscous sealing, and can typically would not require additional machining following fabrication on a lathe. However, a notable disadvantage is that a contact sealing spool 12 cannot simply be slid into the annular bore between the cores 18 and 20 because the inner diameter of the spool 12 (at its interior sealing lands 36) is smaller than the outer diameter of the inner core 18 (at its sealing lands 42), and the outer diameter of the spool 12 (at its exterior sealing lands 36) is larger than the inner diameter of the outer core 20 (at its sealing lands 48). As a result, assembly requires, for example, heating of the outer core 20 and cooling of the spool 12 so that thermal expansion and contraction will alleviate the diametrical interference and allow assembly of the spool 12 with the outer core 20, after which the assembled spool 12 and outer core 20 must be heated and the inner core 18 cooled to permit their assembly. An alternative assembly method is to employ mechanical stretching, in accordance with techniques known to those skilled in the art.

As evident from FIGS. 5 through 9, the spool 12 is configured to be both radially and axially force balanced. Specifically, the axially-facing surfaces of the spool 12 (e.g., defining the axially-spaced circumferential channels 28 and 30) are approximately equal in surface area and, during operation of the valve assembly 10, are subjected to approximately equal and opposite pressures so that the resulting axial forces substantially cancel each other out, and radially-facing surfaces of the spool 12 (e.g., defining the spool sealing lands 36 and channels 28 and 30) are approximately equal in surface area and, during operation of the valve assembly 10, are subjected to approximately equal and opposite pressures so that the resulting radial forces substantially cancel each other out. Though the spool 12 is designed to be balanced, there can be a net force on the spool 12 attributable to flow forces. These forces are created by fluid flow dynamics that act on the spool 12, and can be categorized as viscous flow forces, dynamic flow forces, and steady-state flow forces. Viscous flow force is due to the shearing of fluid in the direction of flow. Viscous flow forces are usually very small, and can be neglected because it is not significant compared to the forces generated by the actuators 16. Dynamic flow forces are due to an accelerating column of fluid, and therefore only exists where the flow rate through the valve assembly 10 is changing. For example, actuation of the spool 12 to open or close the valve assembly 10 or a change in pressure differential across the assembly 10 will result in dynamic flow forces. However, this flow force can also be neglected because the column of fluid around the spool 12 is very small, and the density of fluid is much less than the materials (e.g., steel) from which the valve assembly 10 is made. Furthermore, dynamic flow forces generally cancel each other out because of the multiple flow paths provided by the spool 12. Dynamic flow forces are also caused by a net momentum flux into the spool cavity that causes a pressure differential on the lands 36, 42, and 48. As evident from FIGS. 5 and 7, flow enters the spool cavity through the inlet flow channels 38 at equal and opposite angles, with the result that dynamic flow forces attributable to this source will again mostly cancel each other out.

Figure 12:
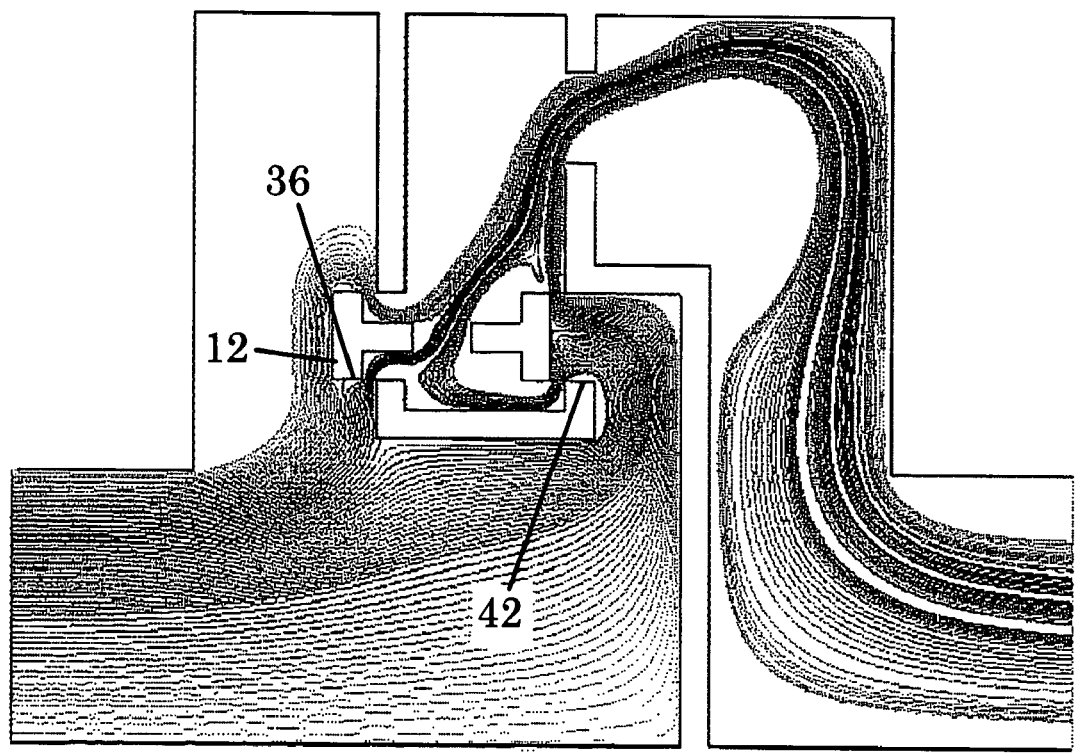
FIG. 12 represents an analytic model of a spool analyzed by computational fluid dynamics (CFD) software to assess the force balance of spools configured in accordance with the present invention.

To more fully assess the force balance of spools configured in accordance with this invention, an analytical study using Computation Fluid Dynamics (CFD) was performed on the spool configuration shown in FIG. 12. The analysis employed a flow rate of 10 µm for fluids having viscosities of 01, 0.1, 0.01, and 0.001 kg/m·s. The force for the left and right halves of the spool and the resulting net force indicated in Table I combine viscous and pressure forces. For a viscosity of 0.1 kg/m·s the force on the left half of the spool is 203.71 N and the right half is −198.71 N, for a net force of 5.01 N. As such, the flow forces effectively cancel each other out.

TABLE I

| µ (kg/m · s) | Pressure Drop (psi) | Left Spool Force (N) | Right Spool Force (N) | Net Spool Force (N) |
|---|---|---|---|---|
| 1 | 3390 | 1621.54 | −1613.34 | 8.20 |
| 0.1 | 460 | 203.71 | −198.71 | 5.01 |
| 0.01 | 143 | 67.00 | −64.43 | 2.56 |
| 0.001 | 125 | 56.60 | −55.11 | 1.49 |

It will be appreciated that the valve assembly 10 will not have perfect symmetry, and therefore flow forces will not cancel each other entirely. Nonetheless, it is believed that flow forces will cancel each other sufficiently so as not to drastically affect operation of the valve assembly 10 and its annular-shaped spool 12. An empirical study with a nonsymmetric valve suggested flow forces would be at most about 1 N for a flow rate of about 1 µm and a pressure drop of about 3000 psi drop, which by extrapolation suggests flow forces of at most 10 N for a flow rate of about 10 lpm. Assuming the use of actuators capable of generating an electromagnet force of about 40N, it is believed a flow force of about 10 N would not have a significant affect on the dynamic response of the spool 12.

Figure 13:
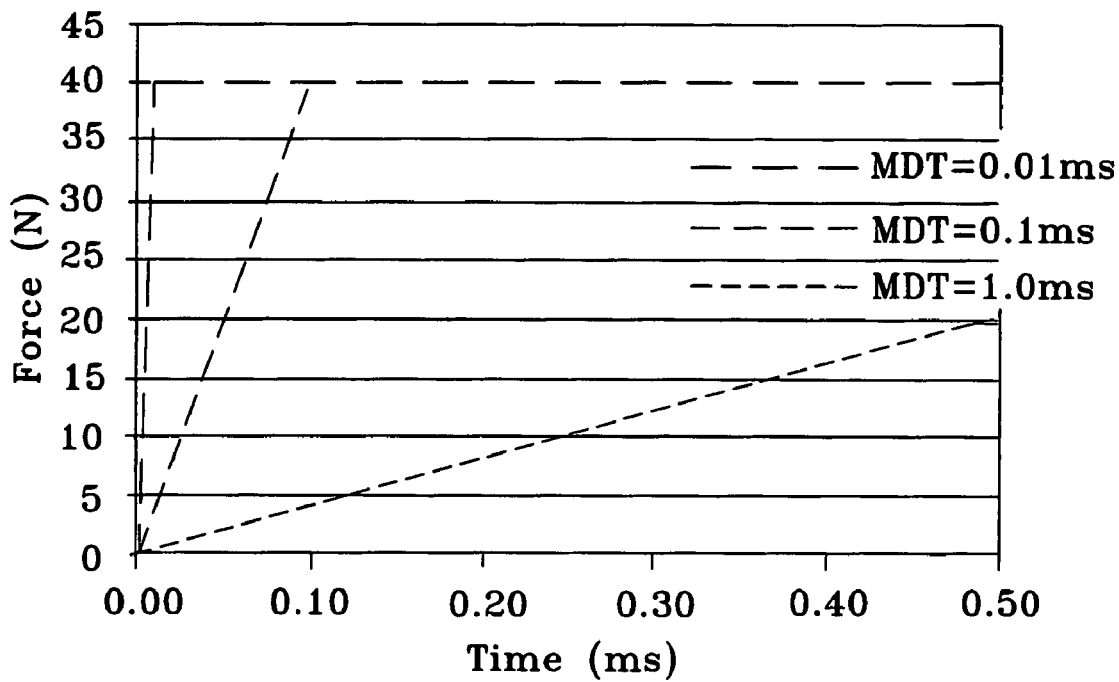
FIGS. 13 and 14 are graphs plotting force versus time and position versus time, respectively, based on analytic models of valve assemblies of this invention.
Figure 14:
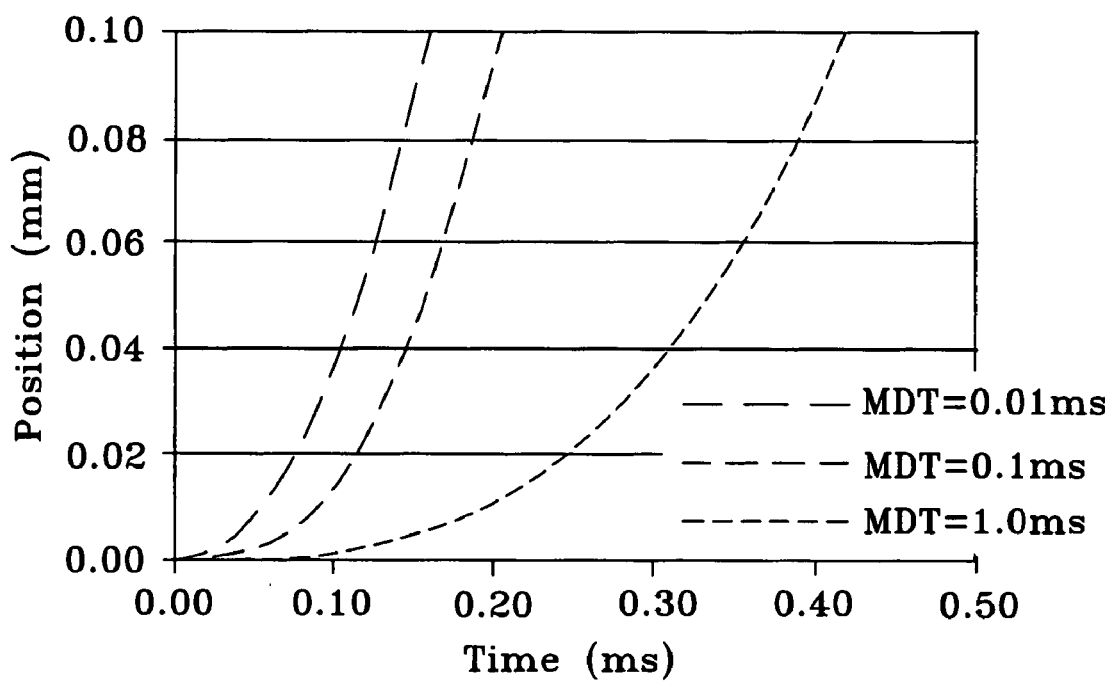

Further modeling of the spool 12 was conducted to assess its dynamic response. Motion of the spool 12 was modeled using several assumptions. The electromagnet force was assumed to be a linear ramp, up from zero force at zero MDT to full force at one MDT. Damping was neglected. Added mass from fluid being moved along the spool was neglected. Flow forces were neglected because they depend on the system in which the spool is being implemented in. A saturation force of 40N was chosen, as well as a conservative 5 g moving mass found from the CAD model of the spool 12 shown in FIG. 3. Three simulations were performed with MDT's of 1 ms, 0.1 ms, and 0.01 ms, and valve movement of 0.1 mm between fully open and closed. The results of this analysis are represented in FIGS. 13 and 14, which graph the transient electromagnet force and transient spool position, respectively. For MDT'S of 1 ms, 0.1 ms, and 0.01 ms, opening and closing times were 0.42 ms, 0.20 ms, and 0.16 ms, respectively. These results are much better than the original goal of 0.5 ms, and could be improved with a more optimized design capable of increasing force, decreasing moving mass, or decreasing required stroke.

Various applications are envisioned for the valve assembly 10 described above, including actuator control by fluid power pulse width modulation (PWM), pump displacement control by PWM, automotive application such as camless engines and active suspension and stability control including anti-lock braking systems (ABS). Such applications would benefit from fast-acting, efficient and relatively inexpensive fluid control valve of this invention. As evident from the above, such benefits are attributable to the particular combination of components of the valve assembly 10, including the annular-shaped electromagnet actuators 16 that provide a higher force-to-mass ratio and shorter MDT than what is possible with square or disk-shaped electromagnets, and the annular-shaped, thin-walled, lightweight spool 12 capable of very high flow area to mass ratios, cancellation of radial pressure forces to effectively eliminate hoop stresses, and multiple flow paths that enable the valve assembly 10 to have a high flow area to displacement ratio, allowing for a relatively short stroke that is compatible with the operation of the annular-shaped actuators 16.

FIGS. 15 through 18 depict additional configurations for valve assemblies that are in accordance with further embodiments of this invention and believed to be capable of benefitting from some of the desirable features noted above. In these Figures, consistent reference numbers are used to identify functionally similar structures.

Figure 15:
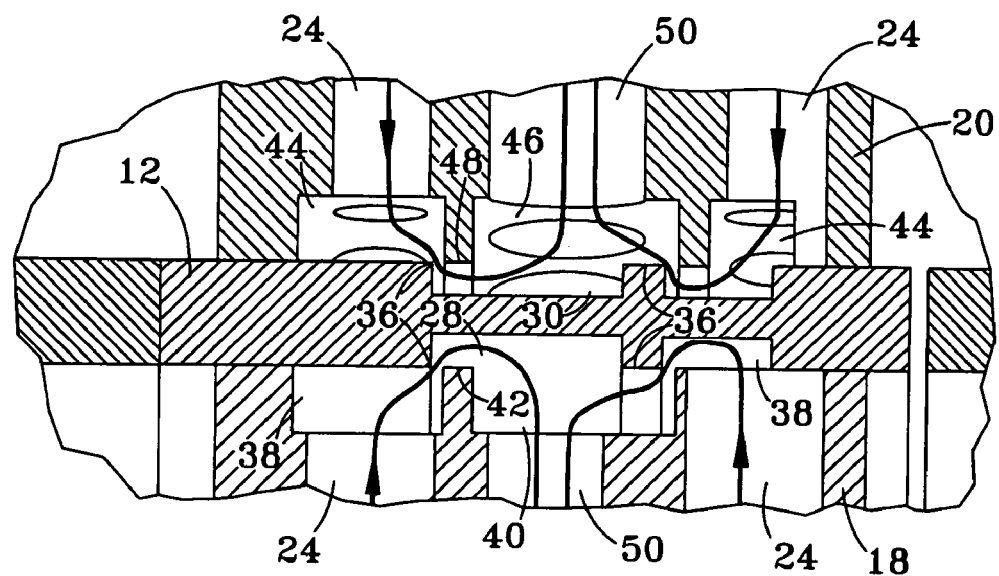
FIG. 15 is an axial cross-sectional view similar to FIG. 7, but showing a valve assembly configured in accordance with a second embodiment of this invention.

In FIG. 15, the spool 12 does not have the radial passages 32 of the previous embodiments. As evident from the foregoing, the presence of radial passages 32 in the spool 12 provides the advantage of conducting fluid to the opposite side (e.g., exterior in the Figures) of the spool 12 for radial force balancing. Alternatively, FIG. 15 shows how radial force balancing can be achieved by providing inlet and outlet fluid passages 24 and 50 within the outer core 20, as well as those provided in the inner core 18 as shown in FIGS. 1, 2, and 4 through 9.

Figure 16:
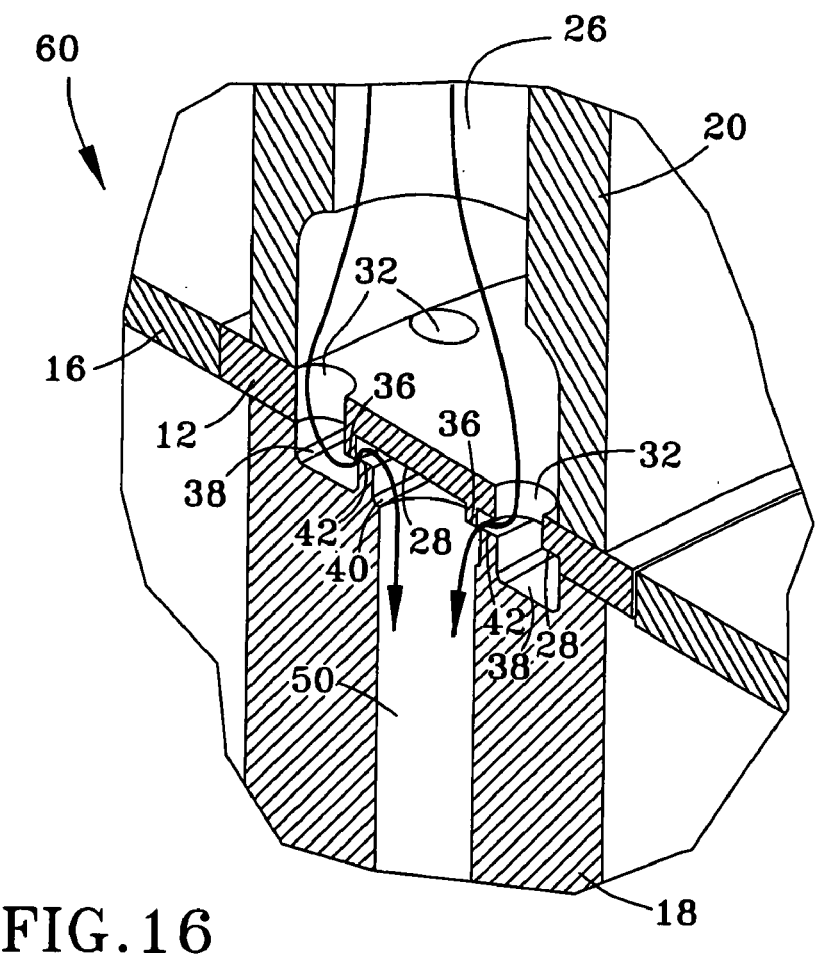
FIG. 16 is a perspective view of axial cross-sections through a valve assembly configured in accordance with a third embodiment of this invention.

In FIG. 16, a low pressure valve assembly 60 is represented as combining an annular-shaped spool 12 and annular-shaped electromagnet actuators 16. As with the previous embodiment, the spool 12 is represented as being capable of having a very short stroke as a result of the multiple radial passages 32 defined in the spool 12, which are fluidically coupled to flow channels 44 in the inner core 18 of the assembly 60. As before, sealing lands 36 on the spool 12 are configured for contact sealing with sealing lands 42 on the inner core 18, which when the spool 12 is actuated to its open position shown in FIG. 16 create axial flow paths through which fluid is able to flow into axial outlet fluid passages 50 within the inner core 18. A notable difference of the valve assembly 60 compared to the previous assembly 10 is that the spool 12 and cores 18 and 20, while configured to be axially force balanced, are not configured to provide radial (interior-exterior) force balancing, thus limiting the valve assembly 60 to relatively low pressure applications.

Figure 17:
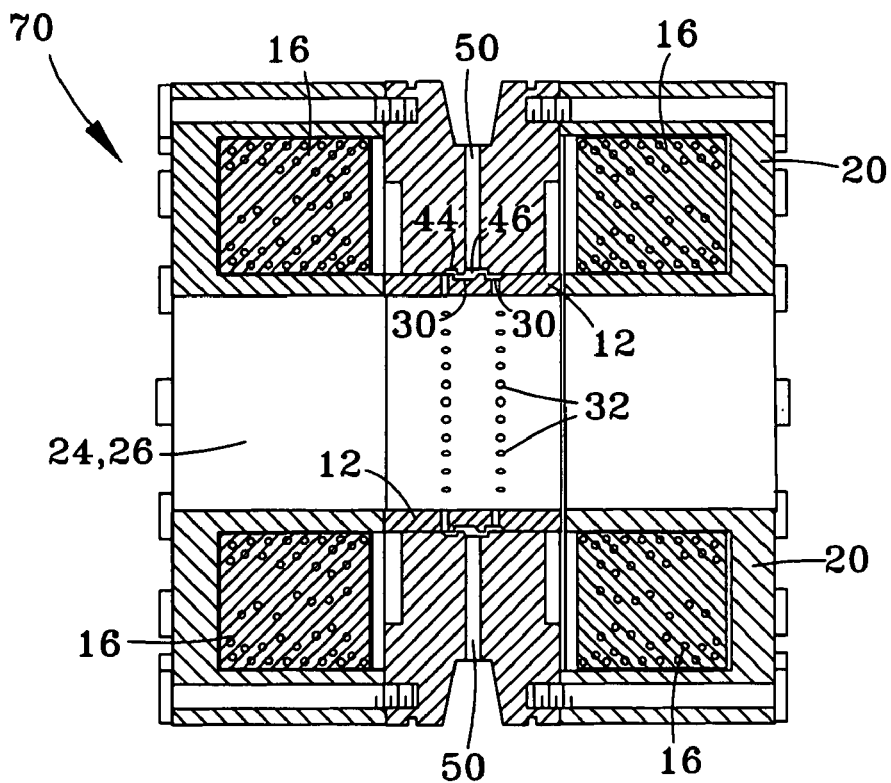
FIGS. 17 and 18 are axial cross-sectional views of valve assemblies configured in accordance with fourth and fifth embodiments of this invention.
Figure 18:
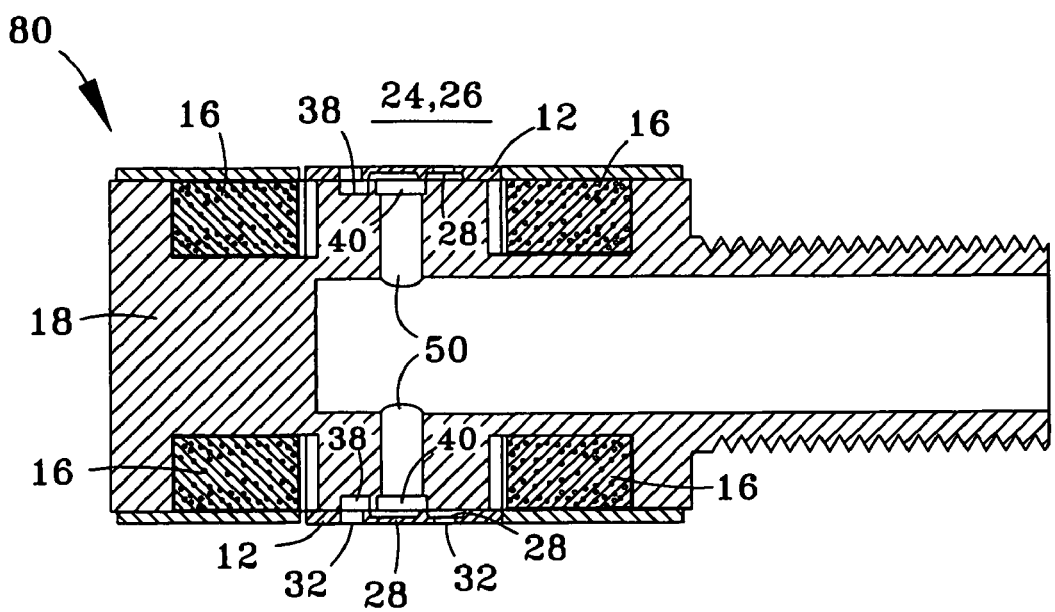

FIGS. 17 and 18 depict additional configurations for low pressure valve assemblies 70 and 80 of the type shown in FIG. 16. FIG. 17 depicts an embodiment that omits the inner core 18 of the previous embodiments, constructs the outer core 20 as an assembly of three annular-shaped members, and employs a single actuator 16 at each end of the spool 12. By eliminating the inner core 18, the annular-shaped spool cavity in which the spool 12 is disposed is not an enclosed chamber, but instead is an annular-shaped recess defined by the outer core 20. As with the embodiment of FIG. 16, though the spool 12 is axially force balanced, it is not radially force balanced as a result of the entire radially interior surface of the spool 12 being subjected to the fluid pressure within the fluid passage 24 and 26.

FIG. 18 depicts an embodiment in which, in contrast to that of FIG. 17, the outer core 20 of the previous embodiments is omitted and, similar to FIG. 17, a single actuator 16 is employed at each end of the spool 12. As with the embodiment of FIG. 17, by eliminating the outer core 20, the annular-shaped spool cavity in which the spool 12 is disposed is not an enclosed chamber. Instead, the spool cavity shown in FIG. 18 is an annular-shaped recess defined by the inner core 18. Again, though the spool 12 is axially force balanced, it is not radially force balanced as a result of the entire radially exterior surface of the spool 12 being subjected to the fluid pressure at the exterior of the valve assembly 80.

While the invention has been described in terms of specific embodiments, it is apparent that other forms could be adopted by one skilled in the art. For example, the physical configuration of the valve assemblies and spools could differ from those shown, flow direction through the valve assemblies could be reversed, and materials and processes other than those noted could be use. Therefore, the scope of the invention is to be limited only by the following claims.

The invention claimed is:

1. A fluid control valve comprising:
an annular-shaped spool comprising multiple axially-spaced circumferential spool sealing features;
a housing comprising an annular-shaped spool cavity in which the spool is received so as to be capable of axial movement within the spool cavity between first and second spool positions, the housing having multiple axially-spaced circumferential housing sealing features configured and disposed within the spool cavity so that:
with the spool in the first spool position, fluid flow is enabled through the spool cavity, the fluid flow being enabled axially between the circumferential spool sealing features and the circumferential housing sealing features, which are sized and configured to provide axial force balancing of the spool; and
with the spool in the second spool position, the circumferential spool sealing features and the circumferential housing sealing features cooperate to substantially prevent fluid flow through the spool cavity.

2. The fluid control valve according to claim 1, wherein each of the circumferential spool sealing features is paired with a corresponding one of the circumferential housing sealing features to define multiple axial flow paths through the spool cavity.

3. The fluid control valve according to claim 1, wherein the spool further comprises multiple radial passages therethrough and, with the spool in the first spool position, fluid flow is also enabled radially through the radial passages of the spool.

4. The fluid control valve according to claim 3, wherein the radial passages are located between adjacent pairs of the circumferential spool sealing features.

5. The fluid control valve according to claim 3, wherein at least a portion of fluid flow through the spool cavity flows radially through the radial passages before flowing axially between the circumferential spool sealing features and the circumferential housing sealing features.

6. The fluid control valve according to claim 3, wherein all of fluid flow through the spool cavity flows radially through the radial passages before flowing axially between the circumferential spool sealing features and the circumferential housing sealing features.

7. The fluid control valve according to claim 1, wherein the circumferential housing sealing features of the housing define at least two axially-spaced circumferential-oriented channels within the spool cavity, and the housing comprises a first fluid passage directly fluidically coupled to a first of the circumferential-oriented channels.

8. The fluid control valve according to claim 7, wherein the first fluid passage is an inlet fluid passage to the spool cavity, and the housing further comprises an outlet fluid passage directly fluidically coupled to a second of the circumferential-oriented channels.

9. The fluid control valve according to claim 7, wherein the spool further comprises multiple radial passages therethrough and, with the spool in the first spool position, fluid flow is also enabled radially through the radial passages of the spool.

10. The fluid control valve according to claim 9, wherein each of the radial passages are directly fluidically coupled to a corresponding one of the at least two circumferential-oriented channels.

11. The fluid control valve according to claim 7, wherein the spool further comprises multiple radial passages therethrough and, with the spool in the first spool position, fluid flow is also enabled radially through the radial passages of the spool, the first fluid passage is an outlet fluid passage of the spool cavity, and the housing further comprises an inlet fluid passage directly fluidically coupled to the radial passages of the spool.

12. The fluid control valve according to claim 11, wherein each of the radial passages of the spool are directly fluidically coupled to a second of the circumferential-oriented channels but not the first of the circumferential-oriented channels.

13. The fluid control valve according to claim 1, further comprising means for forcing the spool to move within the spool cavity between the first and second positions.

14. The fluid control valve according to claim 13, wherein the forcing means comprises at least one pair of annular-shaped electromechanical devices located adjacent a first axial end of the spool.

15. The fluid control valve according to claim 14, wherein the annular-shaped electromechanical devices are electromagnets.

16. The fluid control valve according to claim 13, wherein the forcing means comprises a first pair of annular-shaped electromechanical devices located adjacent a first axial end of the spool and a second pair of annular-shaped electromechanical devices located adjacent an oppositely-disposed second axial end of the spool.

17. The fluid control valve according to claim 16, wherein the annular-shaped electromechanical devices are electromagnets.

18. The fluid control valve according to claim 1, wherein the spool cavity is an enclosed chamber.

19. The fluid control valve according to claim 1, wherein the spool cavity is not an enclosed chamber.

20. A fluid control valve comprising:
a spool comprising an annular-shaped spool wall, circumferential-oriented inner spool channels on an interior surface of the spool wall, circumferential-oriented inner spool sealing lands between adjacent pairs of the inner spool channels, circumferential-oriented outer spool channels on an exterior surface of the spool wall, circumferential-oriented outer spool sealing lands between adjacent pairs of the outer spool channels, and radial flow passages extending through the spool wall so as to fluidically couple corresponding pairs of the inner and outer spool channels;
a housing comprising an inner housing portion circumscribed by the spool and an outer housing portion circumscribing the spool, the spool being received in an annular-shaped spool cavity between the inner and outer housing portions so as to be capable of axial movement within the spool cavity between first and second spool positions;
the inner housing portion comprising circumferential-oriented inner housing channels on an exterior surface thereof, circumferential-oriented inner housing sealing lands between adjacent pairs of the inner housing channels thereof, first internal flow passages within the inner housing portion that are directly fluidically coupled to a first set but not a second set of the inner housing channels, and second internal flow passages within the inner housing portion that are directly fluidically coupled to the second set but not the first set of the inner housing channels, the inner housing channels and inner housing sealing lands being disposed within the spool cavity;
the outer housing portion comprising circumferential-oriented outer housing channels on an interior surface thereof and circumferential-oriented outer housing sealing lands between adjacent pairs of the outer housing channels, the outer housing channels and outer housing sealing lands being disposed within the spool cavity, each of the outer housing channels of the outer housing portion being fluidically coupled to a corresponding one of the inner housing channels of the inner housing portion through a corresponding one of the radial flow passages of the spool; and
means for forcing the spool to move within the spool cavity between the first and second positions;
wherein the spool and the inner and outer housing portions are configured so that when the spool is in the first spool position within the spool cavity a continuous fluid course is defined through the flow control valve, the continuous fluid course comprising
the first internal flow passages within the inner housing portion fluidically coupled to the first set of the inner housing channels of the inner housing portion,
the first set of the inner housing channels of the inner housing portion fluidically coupled to the second set of the inner housing channels of the inner housing portion through axial flow passages between the inner spool sealing lands of the spool and the inner housing sealing lands of the inner housing portion,
the first set of the inner housing channels of the inner housing portion being further fluidically coupled to the second set of the inner housing channels of the inner housing portion through the radial flow passages,
and wherein the spool and the inner and outer housing portions are configured so that, when the spool is in the second spool position within the spool cavity, the continuous fluid course is closed as a result of closure of the axial flow passages between the inner spool sealing lands of the spool and the inner housing sealing lands of the inner housing portion.

* * * * *